(12) United States Patent
Bowling et al.

(10) Patent No.: US 9,753,830 B2
(45) Date of Patent: Sep. 5, 2017

(54) DYNAMIC PAUSE PERIOD CALCULATION FOR SERIAL DATA TRANSMISSION

(71) Applicant: Microchip Technology Incorporated, Chandler, AZ (US)

(72) Inventors: Stephen Bowling, Chandler, AZ (US); Samar Naik, Chandler, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 0 days.

(21) Appl. No.: 14/199,785

(22) Filed: Mar. 6, 2014

(65) Prior Publication Data

US 2014/0258566 A1    Sep. 11, 2014

Related U.S. Application Data

(60) Provisional application No. 61/775,348, filed on Mar. 8, 2013.

(51) Int. Cl.
| | |
|---|---|
| *H04L 7/00* | (2006.01) |
| *G06F 11/30* | (2006.01) |
| *H04L 7/04* | (2006.01) |
| *H04L 25/38* | (2006.01) |
| *H04L 25/24* | (2006.01) |
| *H04L 7/033* | (2006.01) |
| *H04L 25/49* | (2006.01) |

(52) U.S. Cl.
CPC ........ *G06F 11/3089* (2013.01); *H04L 7/0091* (2013.01); *H04L 7/044* (2013.01); *H04L 25/245* (2013.01); *H04L 25/38* (2013.01); *H04L 7/0331* (2013.01); *H04L 25/4902* (2013.01); *H04L 2007/045* (2013.01)

(58) Field of Classification Search
CPC ............... G06F 11/3089; H04L 7/0331; H04L 25/4902; H04L 7/044
USPC ............................................ 710/18; 375/354
See application file for complete search history.

(56) References Cited

U.S. PATENT DOCUMENTS

| | | | |
|---|---|---|---|
| 4,914,618 A | 4/1990 | Dodge | 713/600 |
| 6,263,033 B1 | 7/2001 | Hansen | 375/370 |
| 2012/0158335 A1* | 6/2012 | Donovan et al. | 702/79 |
| 2012/0195400 A1* | 8/2012 | Tomar | H04L 7/0331 375/354 |

OTHER PUBLICATIONS

Ernst, Rolf et al., "Hardware-Software Cosynthesis for Microcontrollers," IEEE Design & Test of Computers, vol. 10, No. 4, 12 pages, Dec. 1, 1993.
"J2716_201001 Sent—Single Edge Nibble Transmission for Automotive Applications," SAE Technical Paper Series, Society of Automotive Engineers, 56 pages, Jan. 27, 2010.
International Search Report and Written Opinion, Application No. PCT/US2014/021743, 11 pages, Jun. 5, 2014.

* cited by examiner

*Primary Examiner* — Ernest Unelus
(74) *Attorney, Agent, or Firm* — Slayden Grubert Beard PLLC

(57) ABSTRACT

A serial transmission peripheral device for transmitting serial transmission data with a variable data length includes a pulse forming unit; and a register programmable to set a desired transmission length. The peripheral device is operable to determine an actual transmission length and calculate a length of a pause pulse and to add the pause pulse at the end of a transmission to generate a transmission having a constant length.

12 Claims, 4 Drawing Sheets

DYNAMIC PAUSE PERIOD CALCULATION FOR SERIAL DATA TRANSMISSION

CROSS REFERENCE TO RELATED APPLICATIONS

This application claims the benefit of U.S. Provisional Patent Application Ser. No. 61/775,348, filed Mar. 8, 2013, which is hereby incorporated by reference in its entirety for all purposes as if fully set forth herein.

TECHNICAL FIELD

The present disclosure relates to calculating a dynamic pause period in serial data transmission and, in particular, in association with the SAE Single Edge Nibble Transmission (SENT) J2716 protocol.

BACKGROUND

The SAE J2716 SENT protocol is a point-to-point scheme for transmitting signal values, for example from a sensor to a controller. It requires three wires, wherein one wire is used as a signal line and the other two for a supply voltage and ground and provides for an asynchronous one-way voltage interface. Data is transmitted in nibbles, wherein a nibble is defined as 4 bits. A SENT protocol message encodes data values in the edge-to-edge period of the signal. The message is preceded for synchronization/calibration by a fixed length period which provides a 56 unit time, also known as ticks, reference (According to the SAE J2716 specification, a SENT communication fundamental unit of time can be in the range of 3 µs to 10 µs, wherein the maximum allowed clock variation is ±20% from the nominal unit time). Data values are encoded into nibbles using 12 to 27 unit times. The nibble period detector in a SENT receiver must use a relatively fast clock source to accurately decode the nibble time values.

On a receiver side, a nibble must be detected asynchronously. To this end, as mentioned above, the protocol provides for a synchronization/calibration pulse which is defined to be 56 unit times long. The pulse starts with a falling edge and remains low for 5 or more unit times followed by pulse that fills the remainder of the 56 unit times (UT). Thus, a receiver can easily determine the respective unit time after receiving such a synchronization/calibration pulse. The length of each data nibble is determined by a fixed start pulse (12 UT) followed by a data pulse whose length is defined by its actual value. As each nibble can have a value between 0 and 16, the variable time portion defined by the nibble value N has a length of N*UT. Thus, the receiver must synchronize with the transmitter and determine the length of the respective data pulses to decode the value of each nibble.

The protocol further provides for an optional pause pulse to be added at the end of each protocol. This feature enables a system for synchronous transmission. Such a pause pulse must be generally provided by the user program.

For example, shown in FIG. 1 is a diagram of a SENT data message 100. The data message 100 includes a sync period 102 of 56 unit times; a status nibble 104 of 12-27 unit times; six data nibbles 106 of 12-27 unit times each; a CRC nibble of 12-27 unit times; and the optional pause period 110 of 12-768 unit times. The pause period 110 is provided because SENT packets are of variable length and it is therefore impossible to send data at fixed intervals. The pause period 110 thus provides a "dead time" between packets which allows user software to "pad" data packets to achieve a consistent timing between messages by setting specific message length and constant message rate. Typically, receivers ignore the pause period 110.

The pause period time is typically computed and set manually in software. For example, a user may identify a desired message length and then add the values of the sync nibble 102, status nibble 104, data nibbles 106, and CRC nibble 108 to determine an actual message length. The actual message length is then subtracted from the desired message length; this value is loaded into a register that sets the time interval for the pause period.

Consequently, the software must perform at least seven additions and one subtraction to compute the pause period length for each packet sent. However, this can result in an undue burden on CPU time.

SUMMARY

A serial transmission peripheral device for transmitting serial transmission data with a variable data length in accordance with embodiments includes a pulse forming unit; and a register programmable to set a desired transmission length. The peripheral device is operable to determine an actual transmission length and calculate a length of a pause pulse and to add the pause pulse at the end of a transmission to generate a transmission having a constant length.

In some embodiments, the peripheral device further includes logic configured to perform required addition and subtraction operations in hardware to compute a pause period length. In some embodiments, the pause period length is computed in when the pause period starts. In some embodiments, the pause period is a Single Edge Nibble Transmission protocol pause period.

A method for transmitting data according to embodiments includes setting a desired message length; receiving data from a data buffer for transmission; determining from the received data a data length; determining a pause period length by subtracting the data length from the desired message length; and transmitting the received data with a pause period, the pause period having the determined pause period length.

In some embodiments, the method includes detecting a beginning of a pause period prior to determining the pause period length. In some embodiments, determining a pause period length includes performing the subtracting in hardware. In some embodiments, setting a desired message length comprises setting a desired message length in a register. In some embodiments, the pause period is a Single Edge Nibble Transmission protocol pause period.

A microcontroller in accordance with embodiments includes a peripheral device including a pulse forming unit; and a register programmable to set a desired transmission length, wherein the peripheral device is operable to determine an actual transmission length and calculate a length of a pause pulse and to add the pause pulse at the end of a transmission to generate a transmission having a constant length.

In some embodiments, the microcontroller further includes logic configured to perform required addition and subtraction operations in hardware to compute a pause period length. In some embodiments, the pause period length is computed in when the pause period starts. In some embodiments, the pause period is a Single Edge Nibble Transmission protocol pause period.

A serial data transmitter in accordance with embodiments includes a microcontroller; and a peripheral device operably coupled to the serial data transmitter and configured to implement in hardware pause period length determination prior to data transmission.

In some embodiments, the peripheral device receives from the microcontroller a desired transmission length. In some embodiments, the peripheral device is configured to determine a length of a data message and detect a beginning of a pause period. In some embodiments, the peripheral device is configured to determine the pause period length by subtracting the length of the data message from the desired transmission length. In some embodiments, the peripheral device is configured to transmit the data message along with the pause period having the determined length.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

The SENT protocol transmitter solutions for pause period handling on conventional microcontroller are implemented entirely with software and timer based peripherals. This kind of solution can become impractical because of the CPU time required to service the SENT data transmission.

Various embodiments, however, not only automate the transmission of the SENT message, but go further to eliminate the software overhead associated with the pause period calculation. According to various embodiments, the pause period is calculated dynamically, based on the transmitted data values. Instead of programming a pause period time, the user software programs the desired message length into a register. Transmitter hardware then computes the pause period automatically to keep a constant message length. This provides a greater level of automation and frees the processor so that it may spend time executing more critical tasks.

Thus, various embodiments let the user load the desired total message length into the pause period data register instead of the actual pause period length. The logic will then perform the required addition and subtraction operations in hardware to compute a pause period length. The pause period length is computed in hardware when the pause period starts. Therefore, it will automatically account for any changes to the transmitted data.

Figure 1:
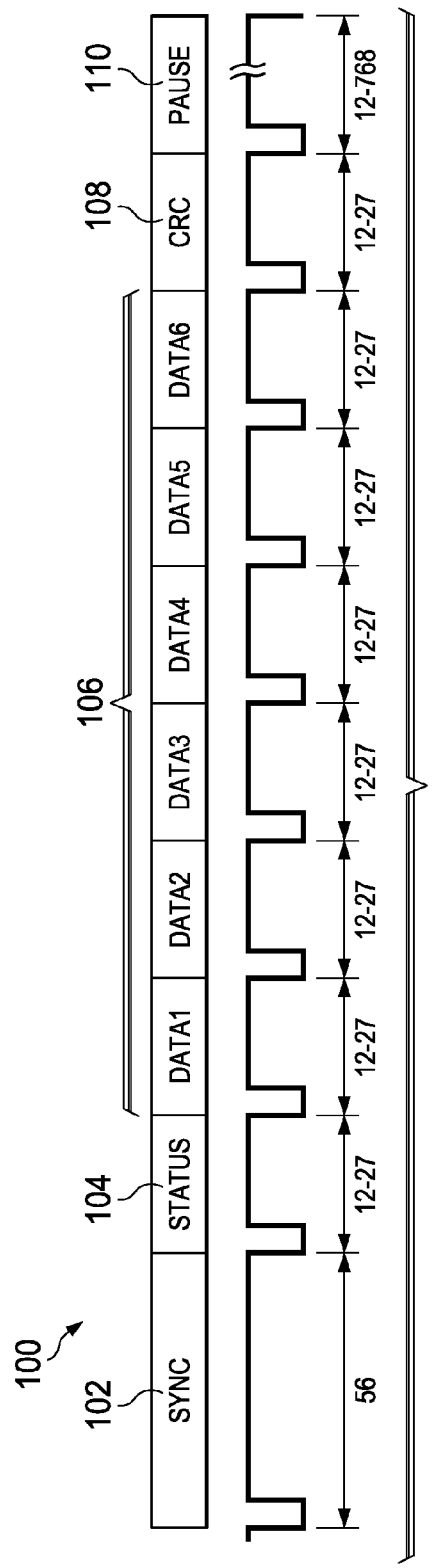
FIG. 1 is a diagram illustrating an exemplary SENT data message.
Figure 2:
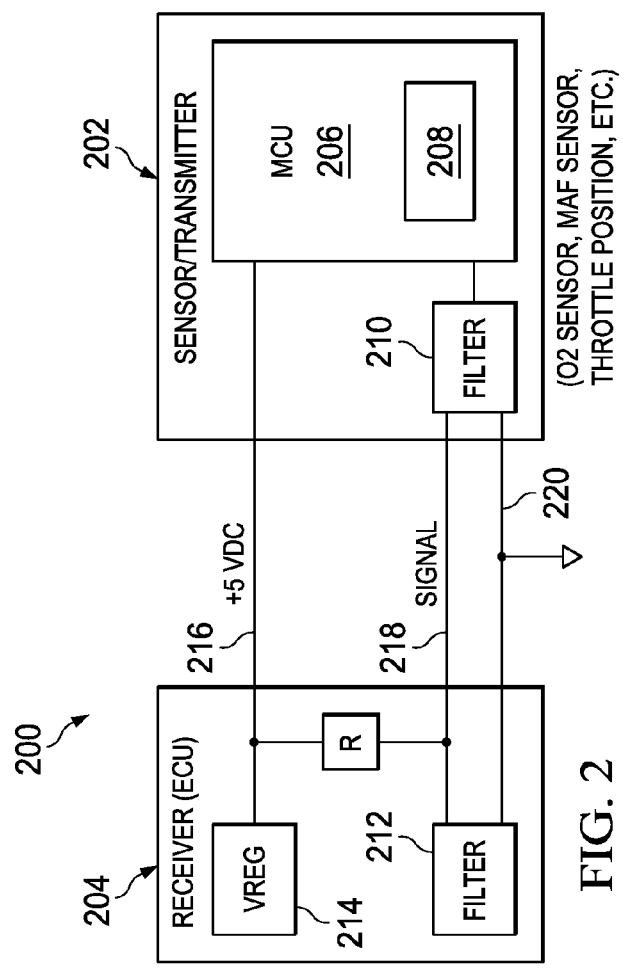
FIG. 2 is a diagram of an exemplary SENT system in accordance with embodiments.

Turning now to the drawings and, with particular attention to FIG. 2, a diagram illustrating an exemplary SENT system in accordance with embodiments is shown. The system 200 includes one or more transmitters 202 and a receiver 204 communicatively coupled via supply voltage line 216, signal line 218, and ground line 220.

The receiver 204 may include a supply voltage source 214 and one or more line filters 212. The transmitter 202 may likewise include one or more line filters 210, as well as a control device such as a microcontroller unit (MCU) 206, which may include or implement one or more pause period control modules 208 in accordance with embodiments.

The system 200 may be embodied as a sensor system for an automotive engine or other system. In such an implementation, the transmitter 202 may comprise an oxygen (O2) sensor, a mass air flow (MAF) sensor, a throttle position sensor, and the like. The receiver 204 in such embodiments may be an engine control unit (ECU).

Figure 3:
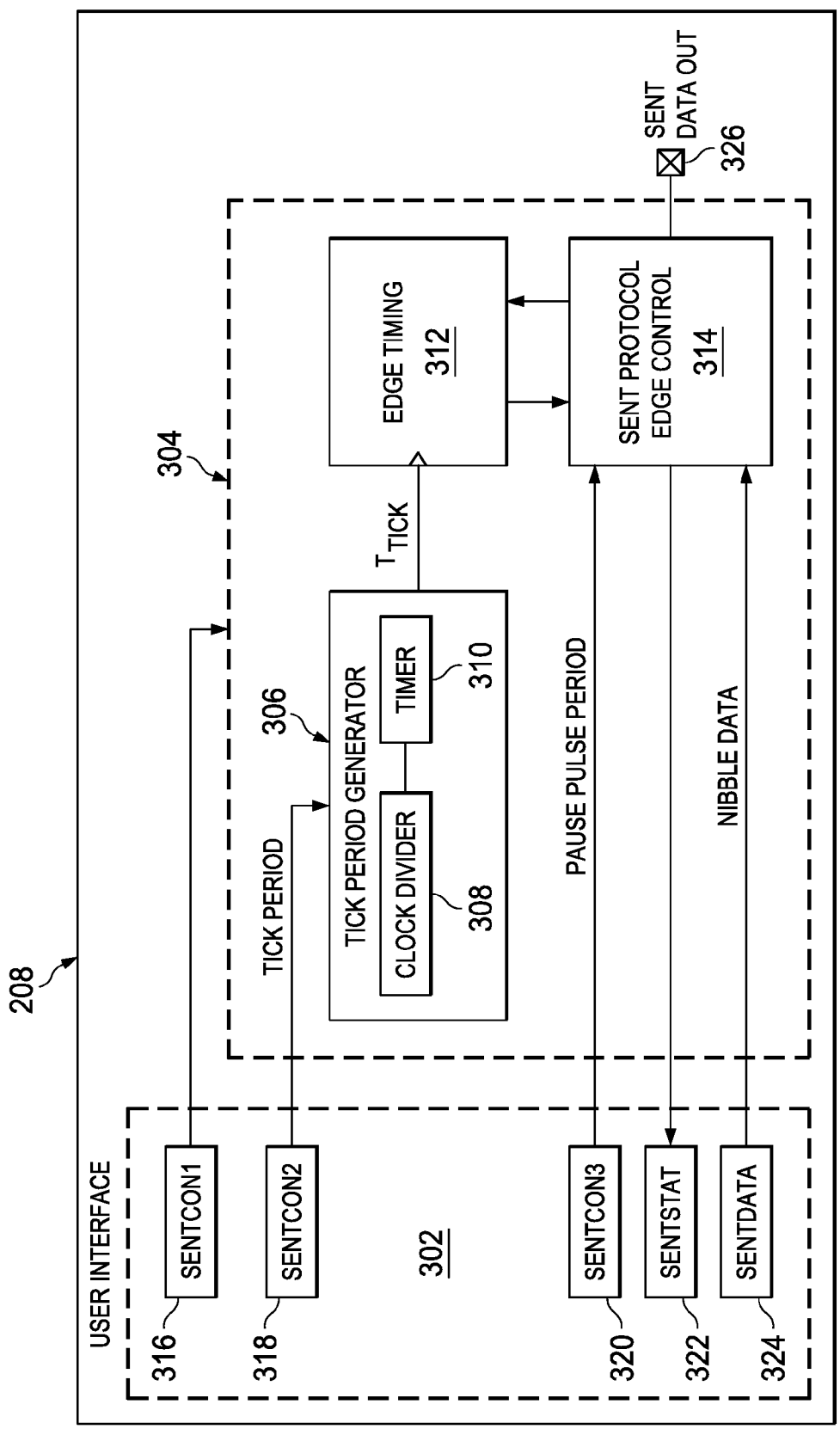
FIG. 3 is a diagram of an exemplary SENT module in accordance with embodiments.

Turning now to FIG. 3, a diagram of an exemplary pause period control module 208 in accordance with embodiments is shown. The pause period control module 208 may be implemented as an on-chip peripheral for a microcontroller and may include a user interface 302 including a plurality of control registers, and a pulse forming unit 302.

The module 208 may include a tick period generator 306, an edge timing module 312, and a SENT protocol edge control module 314. The tick period generator 306 includes a timer 310 and a clock divider 308.

In some embodiments, the SENTCON1 control register 316 is used to set controls such as, for example, receive or transmit modes, a nibble count, whether CRC is enabled, and whether a pause period is to be implemented. In some embodiments, three bits are used in the SENTCON1 control register 316 to select a data nibble count. In some embodiments, the SENTCON2 control register 318 functions as a TICKTIME register, specifying the period for the tick clock generator 306. The SENTCON3 control register 320 may function as a FRMTIME register, specifying a total number of ticks in a data frame. The SENTSTAT control register 322 identifies the status of a transmission, indicating which nibbles are being transmitted at a given time. Finally, the SENTDATA control register 324 stores the data that is to be transmitted.

In operation, the tick period used by the transmitter is set by writing a value to the SENTCON2 (TICKTIME) control register 318. The tick period may be calculated using the following:

$$Ttick = Tclk\,(TICKTIME+1)$$

$$TICKTIME = Ttick/Tclk - 1$$

where (in some embodiments) Tclk is either one clock cycle time Tcy or 4 clock cycle times Tcy and where TICKTIME is the value written into the SENTCON2 control register 318.

The Ttick value is provided to the edge timing module 312 to generate the sync and nibble periods. During a sync period, the SENT data output 326 is driven low for 5 tick periods and driven high for the remainder of the 56 ticks. During a nibble period, the SENT data output 326 is driven low for 5 tick periods and driven high for the remainder of the 12-27 ticks.

As noted above, in some embodiments, a pause pulse is generated after the CRC data nibble has been transmitted. When the pause period generation is enabled, the hardware will dynamically adjust the length of the pause period to maintain a constant length data frame. In some embodiments, user software writes a desired total time for the data frame in tick periods to the SENTCON3 control register 320.

In operation, the module 208 dynamically computes the length of the pause period based on the data written to the SENTDATA register 324. In some embodiments, the length of the pause period is computed at the beginning of the pause period and stored in a buffer (not shown) that is not accessible to the user. Assuming that six data nibbles are transmitted in the message frame, the length of the data frame can vary by as much as 120 tick times when the status nibble and CRC nibble are included.

In each data frame, the module 208 will always transmit 56 ticks for the sync period, at least 12 ticks for the pause period, up to 27 ticks for the status nibble, and up to 27 ticks for the CRC nibble. The sum of these tick times is 122. The value written to the SENTCON3 control register 320 must be equal to or greater than 122+N*27, where N is the number of data nibbles that will be transmitted, based on the control bits in the SENTCON1 control register 316.

If a value written to the SENTCON3 control register 320 is too small, the hardware will not be able to adjust the length of the pause period to keep the data frame a constant length. The pause period is intentionally restricted to a minimum of 12 ticks to avoid a receiver framing error. Secondly, the value written to the SENTCON3 control register 320 should be small enough so that the resulting pause period is 768 ticks or less for all possible message lengths. The minimum data frame length will be 80+N-12 ticks, excluding the pause period itself. Assuming that six data nibbles are transmitted in the data frame, the value written to the SENTCON3 control register 320 should be at least 284, but not greater than 920. This window of values will ensure that the hardware can maintain a constant-length data frame for all nibble data values.

Frame time limit values are summarized below:

$$FRMTIME >/= 122+27N$$

$$FRMTIME </= 848+12N,$$

Where N=number of data nibbles in the message (1-6).

The frametime messages for all settings of NIBCNT[2:0] are given in Table 1 below:

TABLE 1

| NIBCNT[2:0] | Number of Data Nibbles | Min FRMTIME value | Max FRMTIME value |
|---|---|---|---|
| 000 | 6 | 284 | 920 |
| 001 | 5 | 257 | 908 |
| 010 | 4 | 230 | 896 |
| 011 | 3 | 203 | 884 |
| 100 | 2 | 176 | 872 |
| 101 | 1 | 149 | 860 |

For the pause period to be correctly calculated in hardware, all writes to the SENTDATA register must be complete before the pause period begins. Writes to the SENTDATA register during the pause period will not affect the generated length of the pause period. This allows user software to write values for the next data frame while the pause period begins.

Figure 4:
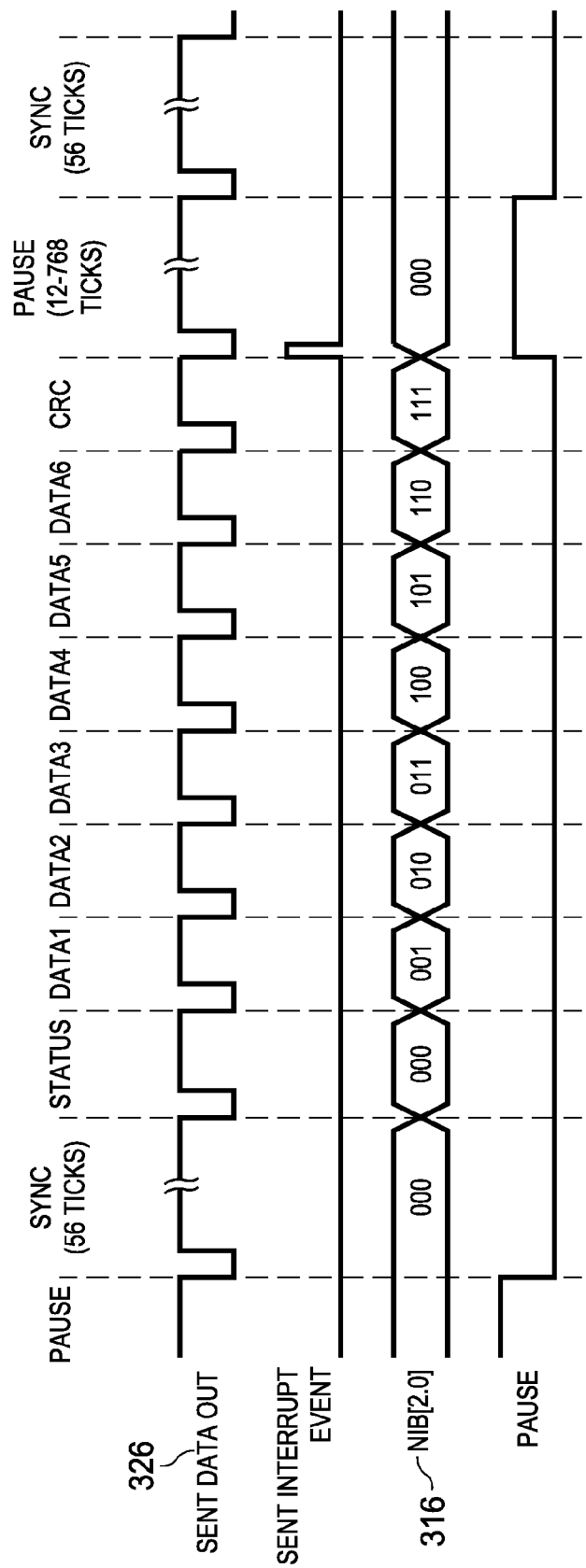
FIG. 4 illustrates timing for an embodiment.

FIG. 4 illustrates exemplary SENT data transmission according to embodiments. The SENT data out on the pin 326 (FIG. 3) is shown at the top. Corresponding values of the NIB bits of the control register 316 are also shown. The PAUSE indicates that a pause period is to be implemented, while the SENT Interrupt event indicates a start of a pause period and when the pause period length determination is made.

Figure 5:
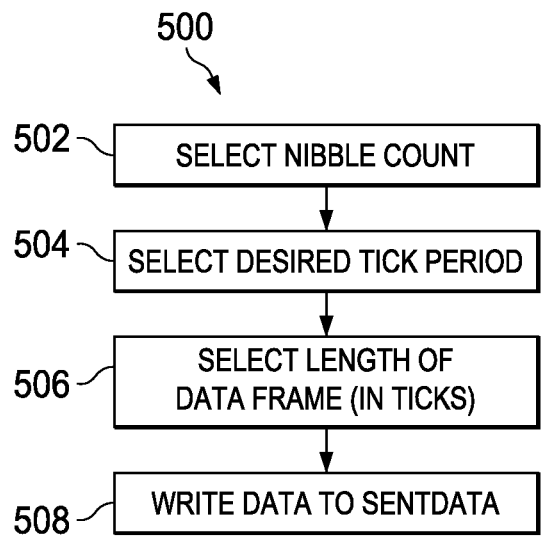
FIG. 5 is a flowchart illustrating embodiments.

Turning now to FIG. 5, a flowchart 500 illustrating operation of embodiments is shown. As shown, a nibble count may be selected (step 502), for example, by programming the SENTCON1 control register NIBCNT bits. A desired tick period may also be selected (step 504), such as by setting the SENTCON2 TICKTIME register. The length of a data frame may also be selected (step 506), such as by setting the SENTCON3 control register 320. Finally, data may be written to the SENTDATA register (step 508).

Figure 6:
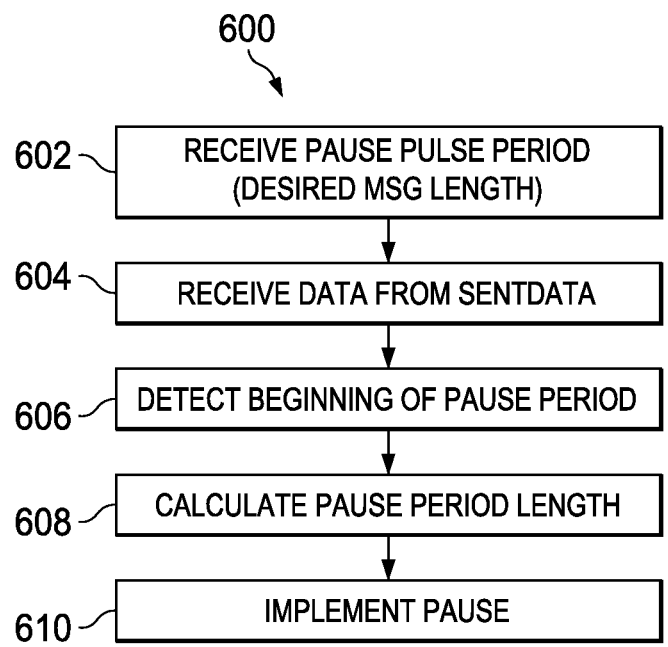
FIG. 6 is a flowchart illustrating embodiments.

Turning now to FIG. 6 a flowchart 600 illustrating operation of embodiments is shown. In particular, the desired message length may be received from the SENTCON3 control register to the SENT protocol edge control module 314. The SENT protocol edge control module 314 may also receive edge timing information from the edge timing module 312 and nibble data from the SENTDATA register (step 604). While data is transmitted, the SENT protocol edge control module 314 may detect a beginning of a pause period (step 606). Once this occurs, the SENT protocol edge control module hardware may calculate the pause period length, by subtracting the length of the transmitted data from the desired message length. Finally, the pause pulse may be implemented (step 610). Status of the transmission may further be updated, by appropriate writes to the status register 322.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary.

While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

What is claimed is:

1. A serial transmission peripheral device for transmitting serial transmission data comprising:
    a transmitter configured to sequentially transmit a plurality of data nibbles, wherein each data nibble is encoded in a variable length data pulse, and
    a register programmable to set a desired transmission length for a plurality of transmission frames each of the plurality of transmission frames including a plurality of sequential variable length data nibble pulses and a pause pulse, wherein the desired transmission length of the transmission frame is a constant pulse width, the constant pulse width not based on a value associated with any one of the plurality of sequential variable length data nibble pulses;
    wherein for each transmission frame, the transmitter is configured to calculate a required length of the pause pulse and to add the pause pulse at the end of a transmission of the plurality of sequential variable length data nibble pulses; and
    wherein the pause pulse length is computed when a pause period starts.

2. The peripheral device according to claim 1, further comprising logic configured to perform required addition and subtraction operations in hardware to compute a pause pulse length.

3. The peripheral device according to claim 1, wherein the pause period is a Single Edge Nibble Transmission protocol pause period.

4. The peripheral device according to claim 1, wherein each variable length data nibble pulse is transmitted within a pulse period comprising a first period at a first logic level having a fixed length followed by a second period at a second logic level defining the variable length nibble pulse.

5. The peripheral device according to claim 1, wherein each transmission frame further comprises a synchronization pulse followed by the plurality of sequential variable length data nibble pulses and the pause pulse.

6. The peripheral device according to claim 1, further comprising a programmable tick period generator generating ticks for controlling a serial transmission signal comprising said transmission frame.

7. A microcontroller, comprising:
    a peripheral device including:
    a transmitter configured to sequentially transmit a plurality of data nibbles, wherein each data nibble is encoded in a variable length data pulse; and
    a register programmable to set a desired transmission length for a plurality of transmission frames each of the plurality of transmission frames comprising a plurality of sequential variable length data nibble pulses and a pause pulse, wherein the desired transmission length of the transmission frame is a constant pulse width, the constant pulse width not based on a value associated with any one of the plurality of sequential variable length data nibble pulses;

wherein for each transmission frame, the transmitter is configured to calculate a required length of the pause pulse and to automatically add the pause pulse at the end of a transmission of the plurality of sequential variable length data nibble pulses; and wherein the pause pulse length is computed when a pause period starts.

8. The microcontroller according to claim 7, further comprising logic configured to perform required addition and subtraction operations in hardware to compute a pause pulse length.

9. The microcontroller according to claim 7, wherein the pause period is a Single Edge Nibble Transmission protocol pause period.

10. The peripheral device according to claim 5, wherein a first variable length data nibble pulse comprises status information and a last variable length data nibble pulse comprises CRC information.

11. The microcontroller according to claim 7, wherein each variable length data nibble pulse is transmitted within a pulse period comprising a first period at a first logic level having a fixed length followed by a second period at a second logic level defining the variable length nibble pulse.

12. The peripheral device according to claim 5, wherein each synchronization pule, variable length data nibble pule and pause pulse is transmitted within a pulse period comprising a first period having a predetermined length at a first logic level followed by a second period at a second logic level.

* * * * *